US011760260B2

(12) United States Patent
Chien et al.

(10) Patent No.: US 11,760,260 B2
(45) Date of Patent: Sep. 19, 2023

(54) METHOD OF CONTROLLING MOTION OF MOBILE WARNING TRIANGLE AND MOBILE WARNING TRIANGLE APPLICANT IN THE METHOD THEREOF

(71) Applicant: Fulian Precision Electronics (Tianjin) Co., LTD., Tianjin (CN)

(72) Inventors: Yu-Ching Chien, New Taipei (TW); Chuang-Wei Tseng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 213 days.

(21) Appl. No.: 17/329,896

(22) Filed: May 25, 2021

(65) Prior Publication Data

US 2022/0055535 A1 Feb. 24, 2022

(30) Foreign Application Priority Data

Aug. 21, 2020 (CN) .......................... 202010849138.4

(51) Int. Cl.
*B60Q 7/00* (2006.01)
*E01F 9/627* (2016.01)
(Continued)

(52) U.S. Cl.
CPC ................ *B60Q 7/00* (2013.01); *E01F 9/629* (2016.02); *G06V 10/56* (2022.01); *G06V 20/588* (2022.01); *G09F 13/16* (2013.01)

(58) Field of Classification Search
CPC ........... B60Q 7/00; E01F 9/629; G06V 10/56; G06V 20/58; G06V 20/588; G09F 13/16; G09F 7/00; G09F 2007/005; G05D 1/0244; G05D 1/0214; G05D 1/0231; G05D 1/0274; G05D 1/0276; G05D 1/0234

See application file for complete search history.

(56) References Cited

U.S. PATENT DOCUMENTS

| 5,525,883 | A | * | 6/1996 | Avitzour | ............... | G05D 1/0234 |
| | | | | | | 318/587 |
| 8,520,954 | B2 | * | 8/2013 | Suzuki | ................... | G08G 1/167 |
| | | | | | | 382/199 |

(Continued)

FOREIGN PATENT DOCUMENTS

| CN | 207225208 | 4/2018 |
| JP | 2014120081 | 6/2014 |
| TW | 201626347 | 7/2016 |

*Primary Examiner* — Adnan Aziz
(74) *Attorney, Agent, or Firm* — ScienBiziP, P.C.

(57) ABSTRACT

A method for controlling the motion of a mobile warning triangle for suitable placement on a roadway acquires information as to color of the lane markings detected by a sensor. When the mobile warning triangle is first placed on the roadway, the sensor is preset in position to detect the lane marking. White or yellow color information of the lane marking or of the black-colored roadway are detected or are not detected by the sensor, and deviations from a required path are recognized when different colors are received in certain combinations by the sensor. If no deviation is recognized in the colors, the mobile warning triangle continues moving forward. If a deviation in colors is recognized, the mobile warning triangle is controlled to hunt to the left and right through one or more predetermined angles to try to detect or redetect the lane marking.

18 Claims, 11 Drawing Sheets

(51) Int. Cl.
*G09F 13/16* (2006.01)
*G06K 9/00* (2022.01)
*G06K 9/46* (2006.01)
*G06V 10/56* (2022.01)
*G06V 20/56* (2022.01)

(56) References Cited

U.S. PATENT DOCUMENTS

| | | | |
|---|---|---|---|
| 9,902,317 B1* | 2/2018 | Chuang | B60Q 1/52 |
| 10,279,740 B1* | 5/2019 | Chien | B60Q 7/00 |
| 10,423,163 B2* | 9/2019 | Choi | A47L 9/2826 |
| 11,385,652 B2* | 7/2022 | Chien | G05D 1/0246 |
| 2002/0154947 A1* | 10/2002 | Farritor | E01F 9/654 |
| | | | 404/9 |
| 2013/0028473 A1* | 1/2013 | Hilldore | G06V 20/56 |
| | | | 382/103 |
| 2016/0202077 A1 | 7/2016 | Huang et al. | |
| 2021/0197712 A1* | 7/2021 | Korjus | B60Q 1/30 |

\* cited by examiner

METHOD OF CONTROLLING MOTION OF MOBILE WARNING TRIANGLE AND MOBILE WARNING TRIANGLE APPLICANT IN THE METHOD THEREOF

FIELD

The subject matter herein generally relates to road safety.

BACKGROUND

A warning triangle raised at a distance from a stationary vehicle or other obstruction warns other vehicles of an obstruction or other dangers ahead. A mobile warning triangle sent out towards a point of placement and in motion may deviate from a correct path.

BRIEF DESCRIPTION OF THE DRAWINGS

Implementations of the present technology will now be described, by way of example only, with reference to the attached figures.

DETAILED DESCRIPTION

Figure 1:
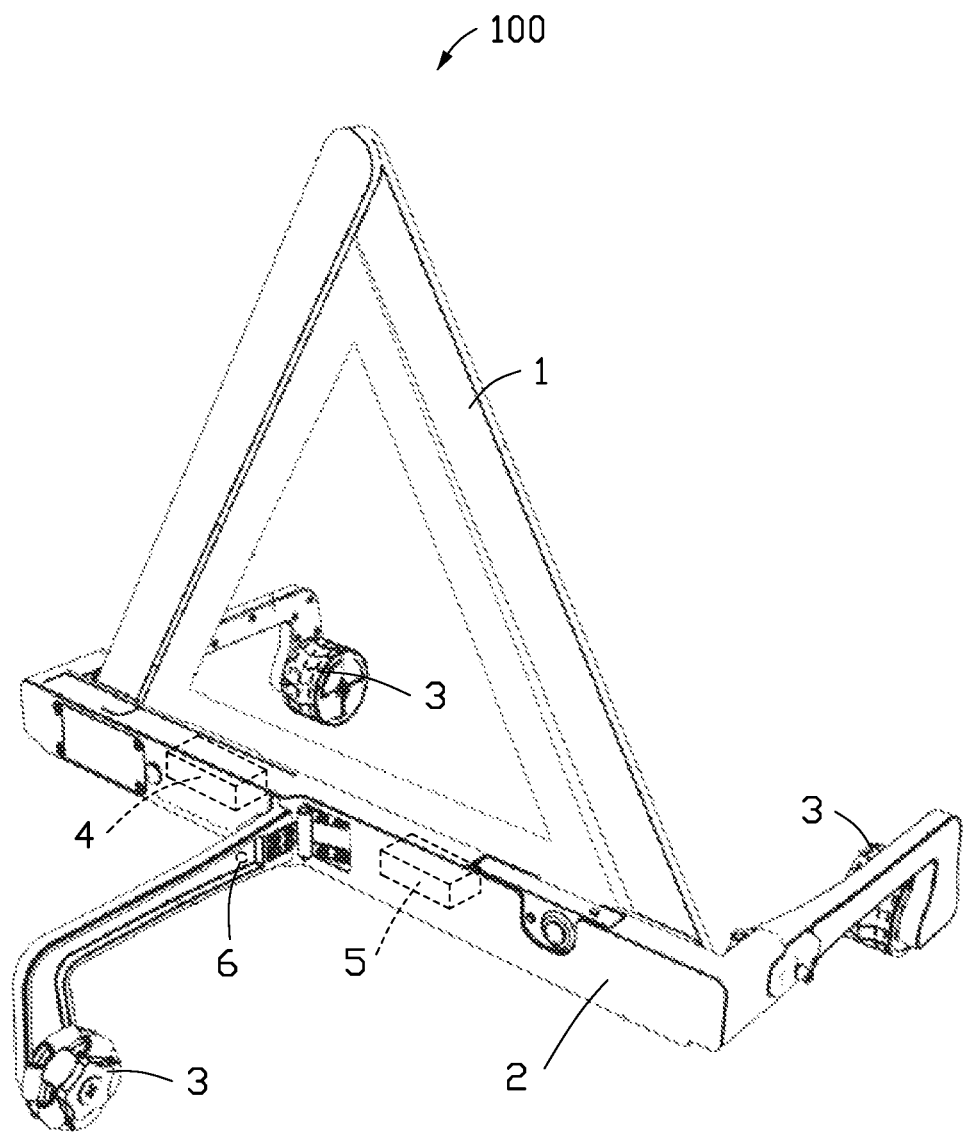
FIG. 1 is a schematic diagram of an embodiment of a mobile warning triangle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a mobile warning triangle 100 in accordance with an exemplary embodiment.

The mobile warning triangle 100 comprises a warning triangle 1, a base 2, three wheels 3, a control device 4, a motor 5, and a sensor 6. The control device 4 can control the mobile warning triangle 100 to move. The control device 4 can further cause and correct a moving direction of the mobile warning triangle 100.

The mobile warning triangle 100 can be raised and placed at a first predetermined distance from a stationary object. The first predetermined distance can be 100 meters or 150 meters for example.

In one embodiment, the sensor 6 can be a color-sensitive sensor. For example, the sensor 6 is TCS3200 color sensor. In the TCS3200 color sensor, if a color filter is selected, only a desired color is allowed to pass, and other primary colors are blocked. If a red filter is selected, the incident red light can be passed, but blue light and green light are blocked, and intensity of the red light can be obtained. Similarly, by selecting other filters, blue light can be passed, obtained, and measured for intensity, and similarly for green light. Then, the colors and intensities of the light incident on the TCS3200 color sensor can be recognized.

In one embodiment, the sensor 6 can be installed at the bottom of the mobile warning triangle 100, such as the bottom of the warning triangle 1 or the bottom of the base 2, to better detect a lane marking. For example, when the mobile warning triangle 100 is moving, the sensor 6 can be directed downward to detect any lane marking.

In one embodiment, the sensor 6 can acquire color information of any scene or object or marking towards which the sensor may be directed.

In one embodiment, two or more sensors can be installed at the bottom of the mobile warning triangle 100, the number of sensors can be according to an actual application.

Figure 2:
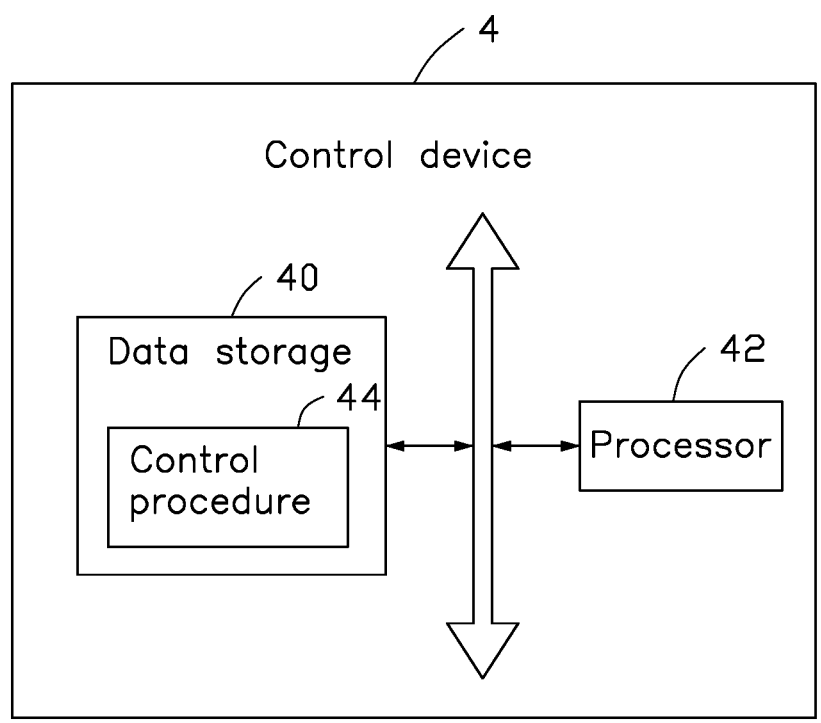
FIG. 2 is a block diagram of an embodiment of a control device of the mobile warning triangle of FIG. 1.

Referring to FIG. 2, the control device 4 can comprise at least one data storage 40, at least one processor 42, and a control procedure 44.

In one embodiment, the data storage 40 can be in the mobile warning triangle 100, or can be a separate external memory card, such as an SM card (Smart Media Card), an SD card (Secure Digital Card), or the like. The data storage 40 can include various types of non-transitory computer-readable storage mediums. For example, the data storage 40 can be an internal storage system, such as a flash memory, a random access memory (RAM) for the temporary storage of information, and/or a read-only memory (ROM) for permanent storage of information. The data storage 40 can also be an external storage system, such as a hard disk, a storage card, or a data storage medium. The processor 42 can be a central processing unit (CPU), a microprocessor, or other data processor chip that achieves functions of the mobile warning triangle 100.

Figure 3:
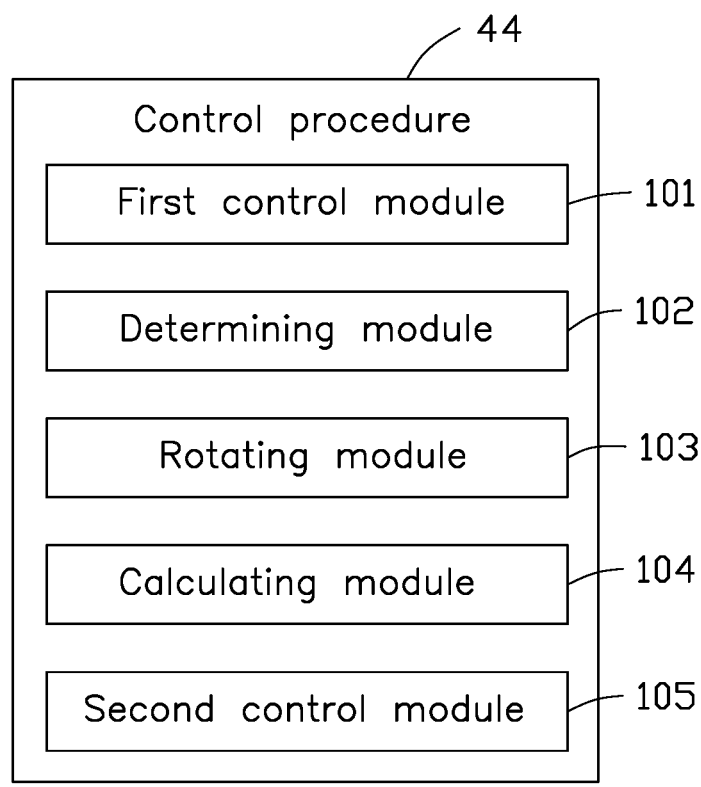
FIG. 3 is a block diagram of an embodiment of a control procedure of the control device of FIG. 2.

FIG. 3 illustrates the control procedure 44 as comprising a plurality of modules, such as a first control module 101, a determining module 102, a rotating module 103, a calculating module 104, and a second control module 105. The modules 101-105 can comprise one or more software programs in the form of computerized codes stored in the data storage 40. The computerized codes can include instructions that can be executed by the processor 42 to provide functions for the modules 101-105.

The mobile warning triangle 100 is placed on a road, and the sensor 6 can detect a lane marking of the road as an example.

The first control module 101 can control the mobile warning triangle 100 to move forward or backward and acquire color information detected by the sensor 6 when the mobile warning triangle 100 is placed on the road and the sensor 6 detects the lane markings of the road.

Figure 4A:
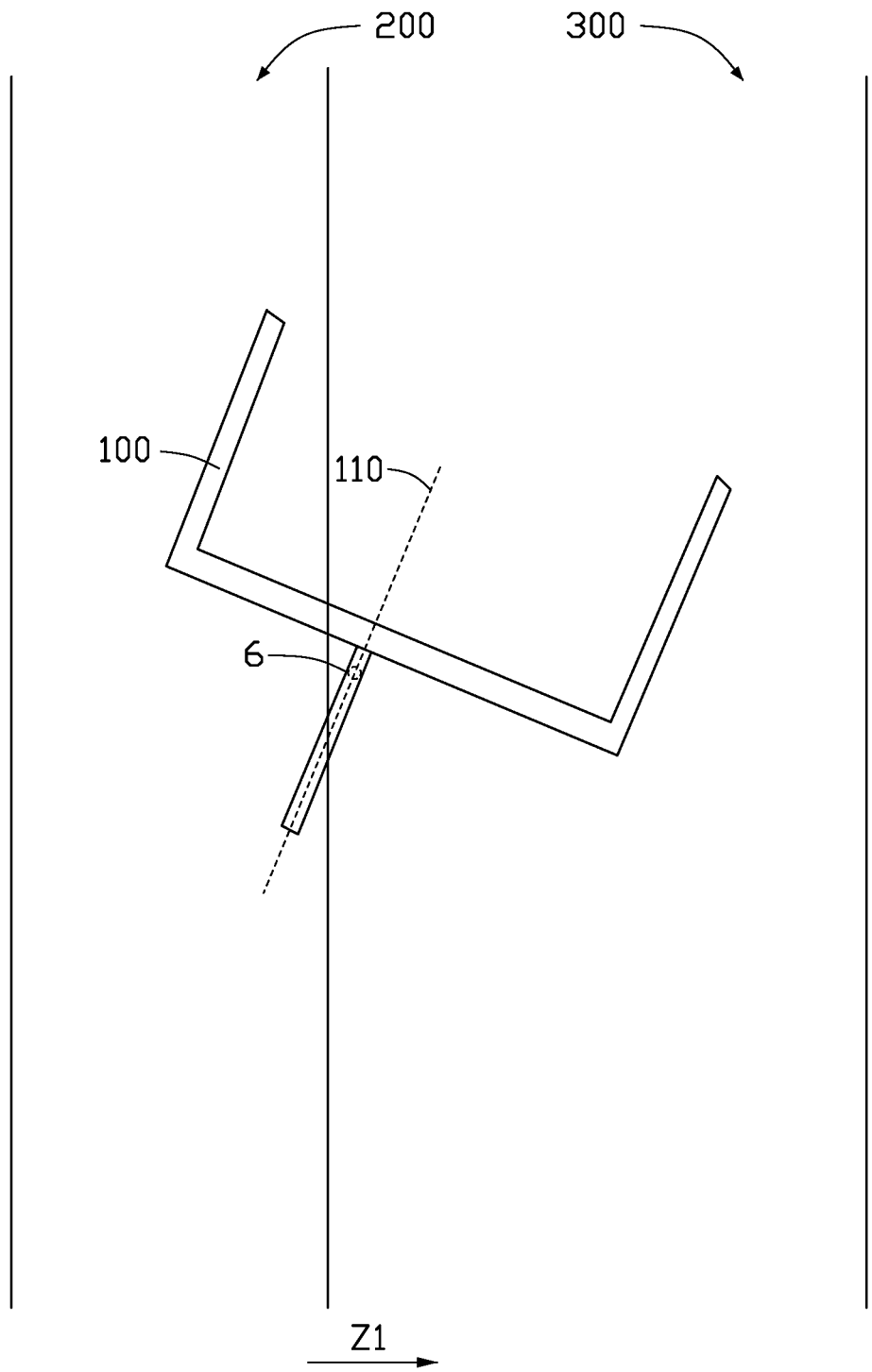
FIGS. 4A, 4B, 4C, 4D, 4E, 4F, and 4G show the mobile warning triangle of FIG. 1 in motion along a lane marking with a sensor in a working state.

The first control module 101 can control the mobile warning triangle 100 to move forward or backward when the mobile warning triangle 100 is placed on the lane 300 (as shown in FIG. 4A) of a road or other traversable surface. The sensor 6 can detect the lane marking 200 (as shown in FIG. 4A). The sensor 6 can acquire the color information when the mobile warning triangle 100 is moving forward or backward.

In one embodiment, the lane markings 200 of the road are white and yellow. Along an expressway or a provincial highway, the lane markings 200 are white markings and yellow markings, the road itself is black. There is a significant difference in color between the road and the lane markings 200. The sensor 6 can easily detect and identify the lane markings 200. When there is an obstacle on the road, the mobile warning triangle 100 is raised at the first predetermined distance from the obstacle to warn other vehicles. A user can place the mobile warning triangle 100 on the lane 300 in which the obstacle, a vehicle for example, is stationary, and aim the sensor 6 at the lane marking 200 of the lane 300 (for example a white marking). The sensors 6 can detect the lane marking 200 to control the mobile warning triangle 100 to move forward along the lane marking 200. When the mobile warning triangle 100 is placed on the lane 300 and the sensor 6 detects the lane marking 200 of the lane 300, the first control module 101 controls the mobile warning triangle 100 to move forward. When the mobile warning triangle 100 is moving, the first control module 101 can obtain the color information detected by the sensors 6 in real time to determine correct tracking or a lane departure by the mobile warning triangle 100.

The determining module 102 determines whether the color information detected by the sensor 6 is the color of the lane marking 200.

In one embodiment, when the first control module 101 obtains information as to color detected by the sensor 6, the determining module 102 can determine whether the color information detected by the sensor 6 is the one color of the lane marking 200.

In one embodiment, when the determining module 102 determines that the color information detected by the sensor 6 is the color of the lane marking 200, the mobile warning triangle 100 is deemed to be still moving forward along the lane marking 200. A deviation of the mobile warning triangle 100 from the required path is absent, and the first control module 101 controls the mobile warning triangle 100 to continue moving forward.

If the color information detected by the sensor 6 is other than the color of the lane marking 200, the rotating module 103 obtains first orientation information of a central axis of the mobile warning triangle 100 and rotates a central axis of the mobile warning triangle 100 to a first direction by a first predetermined angle.

In one embodiment, the central axis of the mobile warning triangle 100 parallels to the current forward direction of the mobile warning triangle 100.

In one embodiment, as shown in FIG. 4A, the first direction Z1 can be a right side of the mobile warning triangle 100, and a second direction Z2 can be a left side of the mobile warning triangle 100. The control device 4 may determine that a deviation has occurred in a moving direction of the mobile warning triangle 100 when the determining module 102 determines that the color information detected by the sensor 6 is not the color of the lane marking 200 (see FIG. 4a and FIG. 4B). When the mobile warning triangle 100 is not moving forward along the lane marking 200 (that is, it is deviating to the left or to the right), the control device 4 determines that a deviation has occurred in a moving direction of the mobile warning triangle 100. In order to determine whether the mobile warning triangle 100 is deviating to the left of the lane marking 200 or to the right of the lane marking 200, the rotating module 103 can obtain the current orientation information (for example, first orientation information a1) of the central axis 110 of the mobile warning triangle 100, and rotate the central axis 110 of the mobile warning triangle 100 towards the first direction by the first predetermined angle. For example, the rotating module 103 can rotate the central axis 110 of the mobile warning triangle 100 towards the right side of the lane marking 200 by the first predetermined angle.

In one embodiment, the first predetermined angle can be defined according to the actual requirement, for example, the first predetermined angle can be 15 degrees.

Coercion mode herein means that the mobile warning triangle 100 has been moved away from the correct course by an external object or event such as a roadside curb, or pothole, or other characteristic of the road. When the color information detected by the sensor 6 is not the color of the lane marking 200, the rotating module 103 needs to determine whether the mobile warning triangle 100 is in coercion mode. If the mobile warning triangle 100 is not in the coercion mode, the rotating module 103 obtains the first orientation information of the central axis 110 of the mobile warning triangle 100 and rotates the central axis 110 of the mobile warning triangle 100 to the first direction Z1 by the first predetermined angle. If the mobile warning triangle 100 is in the coercion mode, the rotating module 103 determines whether the sensor 6 is detecting the color of the lane marking 200.

In one embodiment, the mobile warning triangle 100 may comprise four modes, for example, a swing mode, a self-propelled mode, the coercion mode, and a manual mode. When the mobile warning triangle 100 is in the swing mode, the mobile warning triangle 100 deflects to the first direction Z1 or to the second direction 2 by a predetermined angle to try to detect or redetect the lane marking 200. When the mobile warning triangle 100 is in the self-propelled mode, the mobile warning triangle 100 moves forward. When the mobile warning triangle 100 is in the coercion mode, the mobile warning triangle 100 performs a correction opposite to the last angle of deflection, and moves forward for a first predetermined distance.

In one embodiment, the first predetermined distance can be defined according to the actual requirement, such as the first predetermined distance being 1 meter, 2 meters, and so on. When the mobile warning triangle 100 is in the manual mode, the mobile warning triangle 100 stops moving, and the mobile warning triangle 100 needs external force to be moved.

In one embodiment, the rotating by the rotating module 103 of the central axis 110 of the mobile warning triangle 100 to the first direction Z1 by the first predetermined angle may comprise: performing a direction rotating on the mobile warning triangle 100 to the first direction Z1 by the first predetermined angle and determining whether the color information detected by the sensor 6 is the color of the lane marking 200 during the rotating of the mobile warning triangle 100. The direction rotating on the mobile warning triangle 100 when the color information detected by the sensor 6 is the color of the lane marking 200 is then stopped. That is, when the color information detected by the sensor 6 is the color of the lane marking 200 during the rotating on the mobile warning triangle 100, the direction rotating on the mobile warning triangle 100 can be stopped, even though the actual and resulting rotating angle of the mobile warning triangle 100 may be less than the first predetermined angle.

Figure 4B:
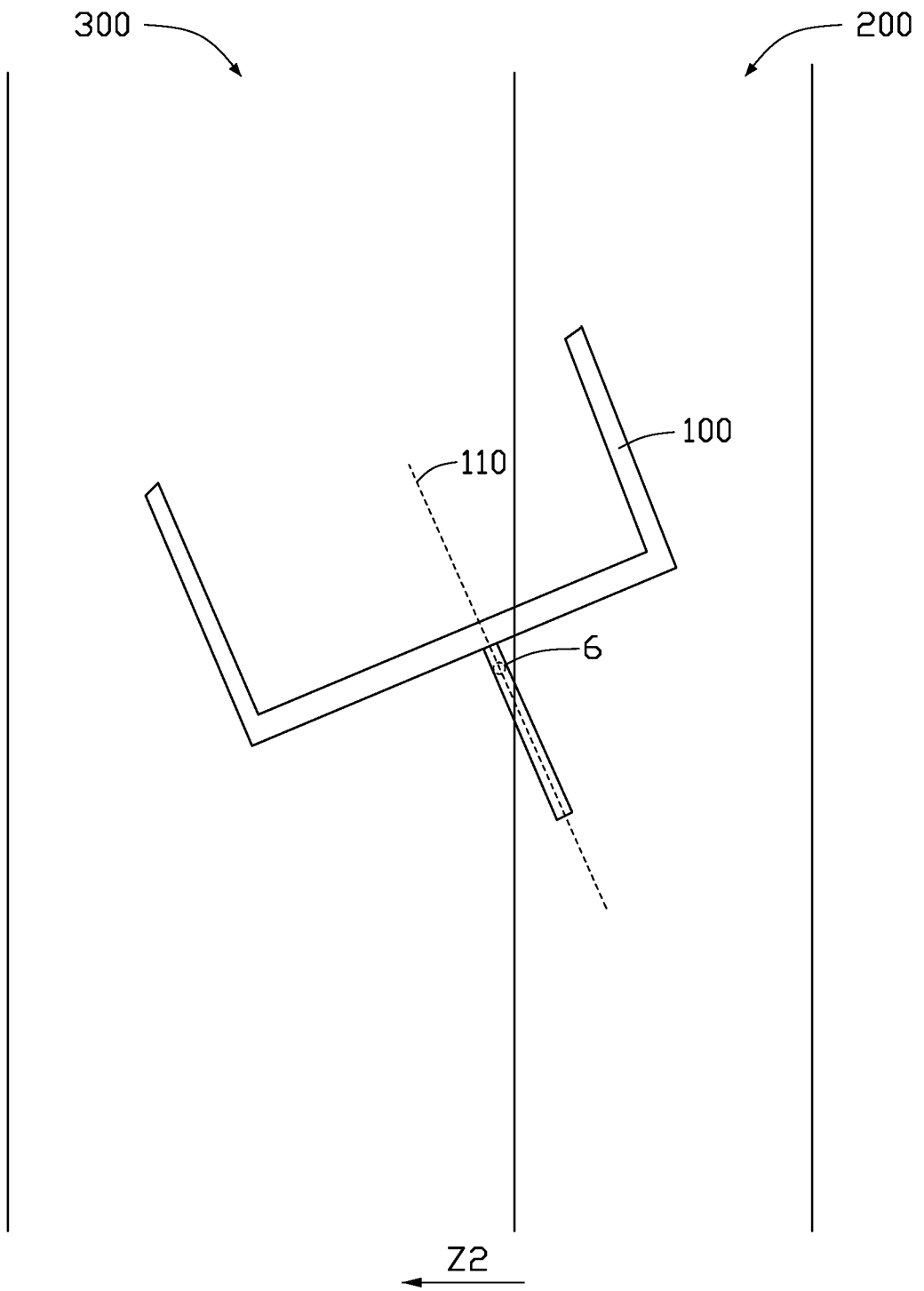
Figure 4C:
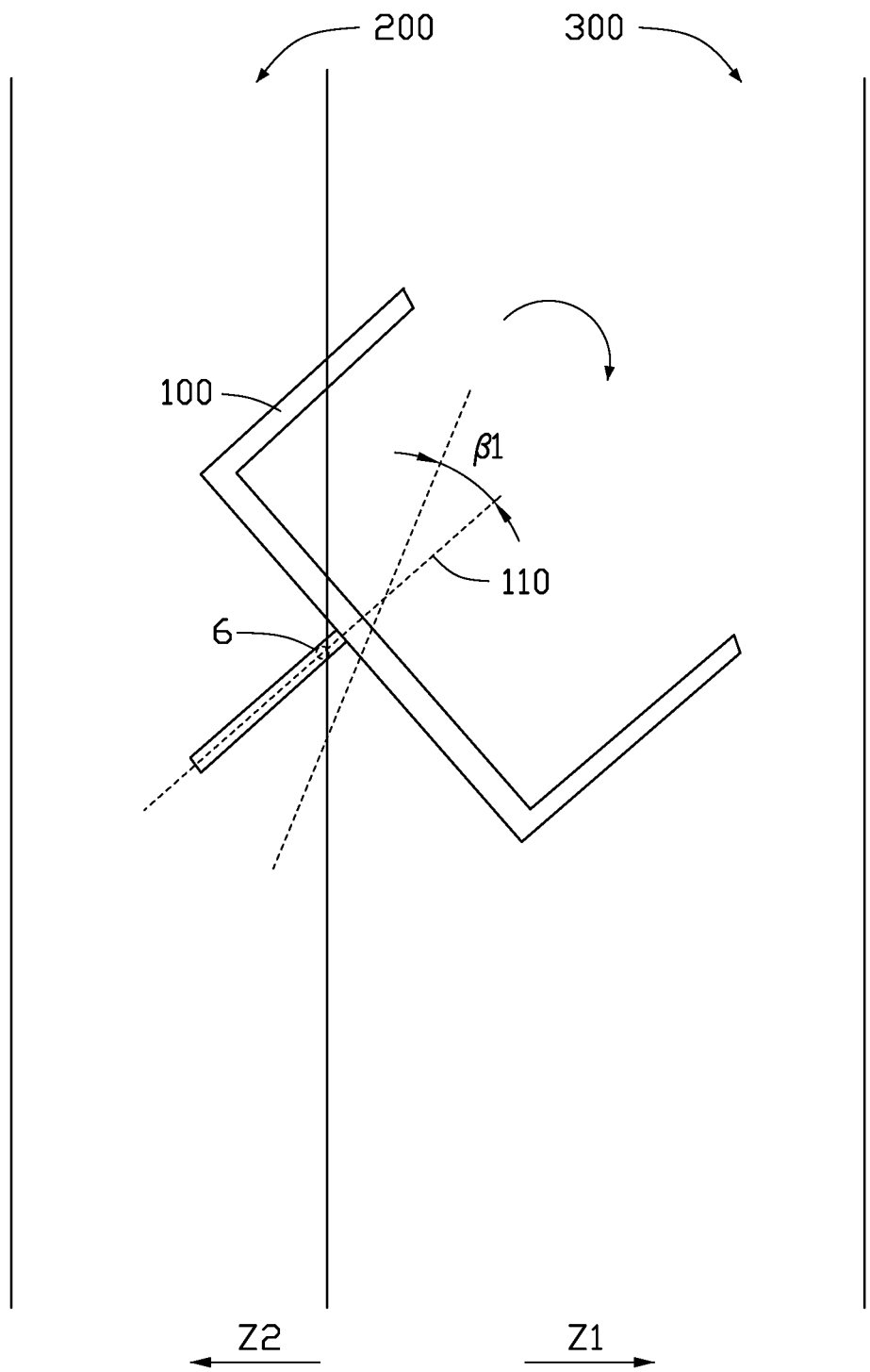

In one embodiment, when the sensor 6 detects the color of the lane marking 200 during the rotating to the first direction Z1 by the first predetermined angle, the rotating module 103 may determine that the mobile warning triangle 100 was previously deviating to the right of the lane marking 200, and the rotating module 103 can control the mobile warning triangle 100 to stop the direction rotating and obtain the current orientation information (for example, second orientation information a2) of the central axis 110 of the mobile warning triangle 100, as shown in FIG. 4C.

The calculating module 104 can calculate a first deflection angle β1 based on the first orientation information a1 and the second orientation information a2 of the central axis 110 of the mobile warning triangle 100.

In one embodiment, as shown in FIG. 4C, the acute angle formed between the first orientation information a1 and the second orientation information a2 is the first deflection angle β1.

Figure 4D:
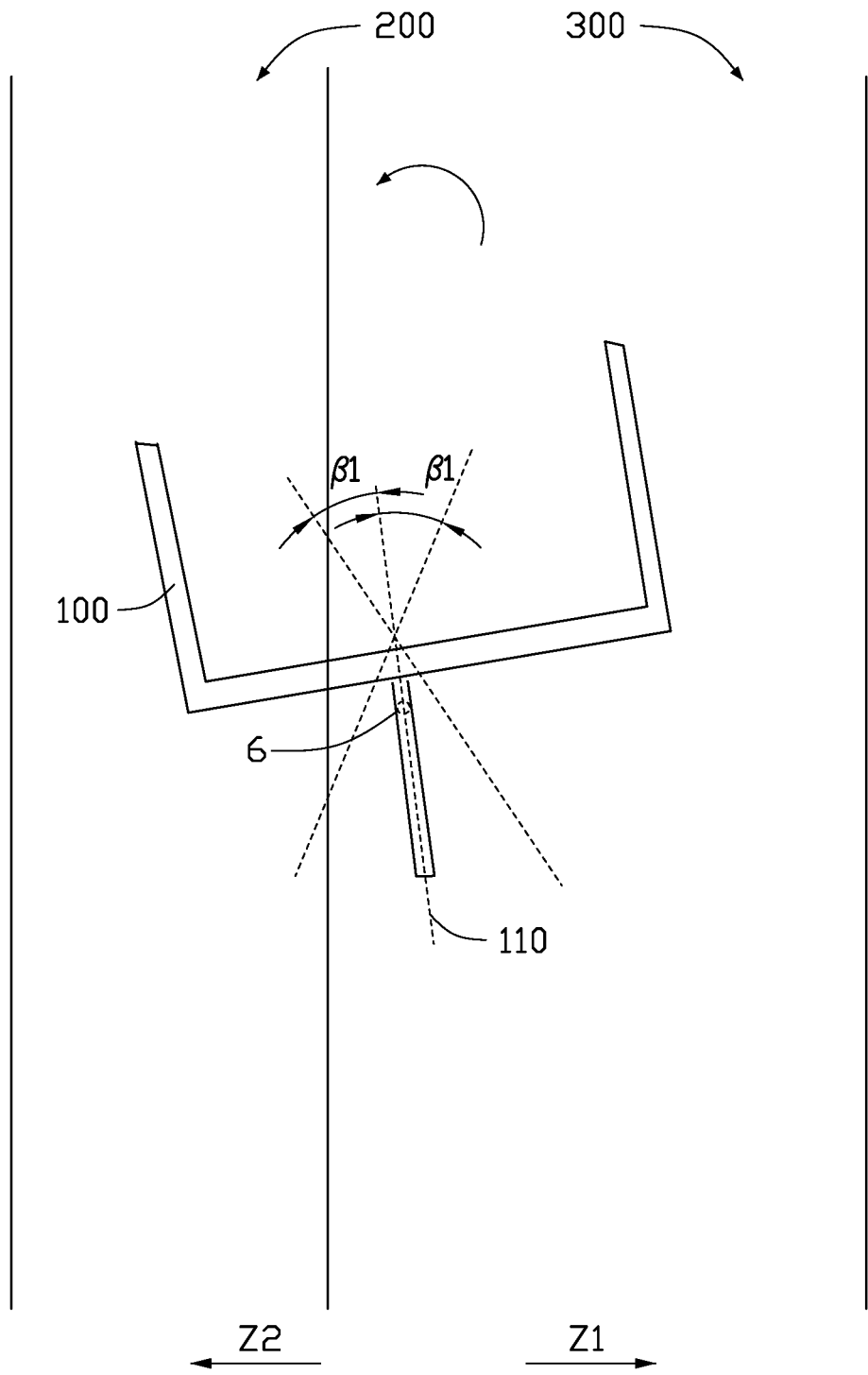

In one embodiment, when the first deflection angle β1 is calculated, the rotating module 103 can rotate again the central axis 110 of the mobile warning triangle 100 to the second direction Z2 by twice the first deflection angle β1, and control the mobile warning triangle 100 to continue moving forward. The warning triangle 100 can be rotated back to the lane marking 200, as shown in FIG. 4D.

When the sensor 6 does not detect the color of the lane marking 200 during the rotating to the first direction Z1 by the first predetermined angle, it indicates that the mobile warning triangle 100 may not be deviating to the right of the lane marking 200, and the rotating module 103 can rotate the central axis 110 of the mobile warning triangle 100 to the second direction Z2 by a second predetermined angle. The second predetermined angle can be greater than the first predetermined angle. For example, the second predetermined angle is twice the first predetermined angle. That is, when the mobile warning triangle 100 has deviated, the rotating module 103 can rotate the central axis 110 of the mobile warning triangle 100 towards the first direction Z1 by the first predetermined angle, to try to detect the lane marking 200. If the lane marking 200 is not detected, the mobile warning triangle 100 is restored to the state of the previous deviation, and the rotating module 103 further rotates the central axis 110 of the mobile warning triangle 100 to the second direction Z2 by the first predetermined angle to try to detect or redetect the lane marking 200. That is, when the mobile warning triangle 100 has deviated, the rotating module 103 controls the mobile warning triangle 100, in swing mode, to swing left and right at the first predetermined angle to try to detect or redetect the lane marking 200.

In one embodiment, when the sensor 6 detects the color of the lane marking 200 during the rotating to the second direction Z2 by the second predetermined angle, the rotating module 103 may determine that the mobile warning triangle 100 was previously deviating to the left of the lane marking 200, and the rotating module 103 can control the mobile warning triangle 100 to stop the direction rotating and obtain the current orientation information (for example, third orientation information a3) of the central axis 110 of the mobile warning triangle 100.

Figure 4E:
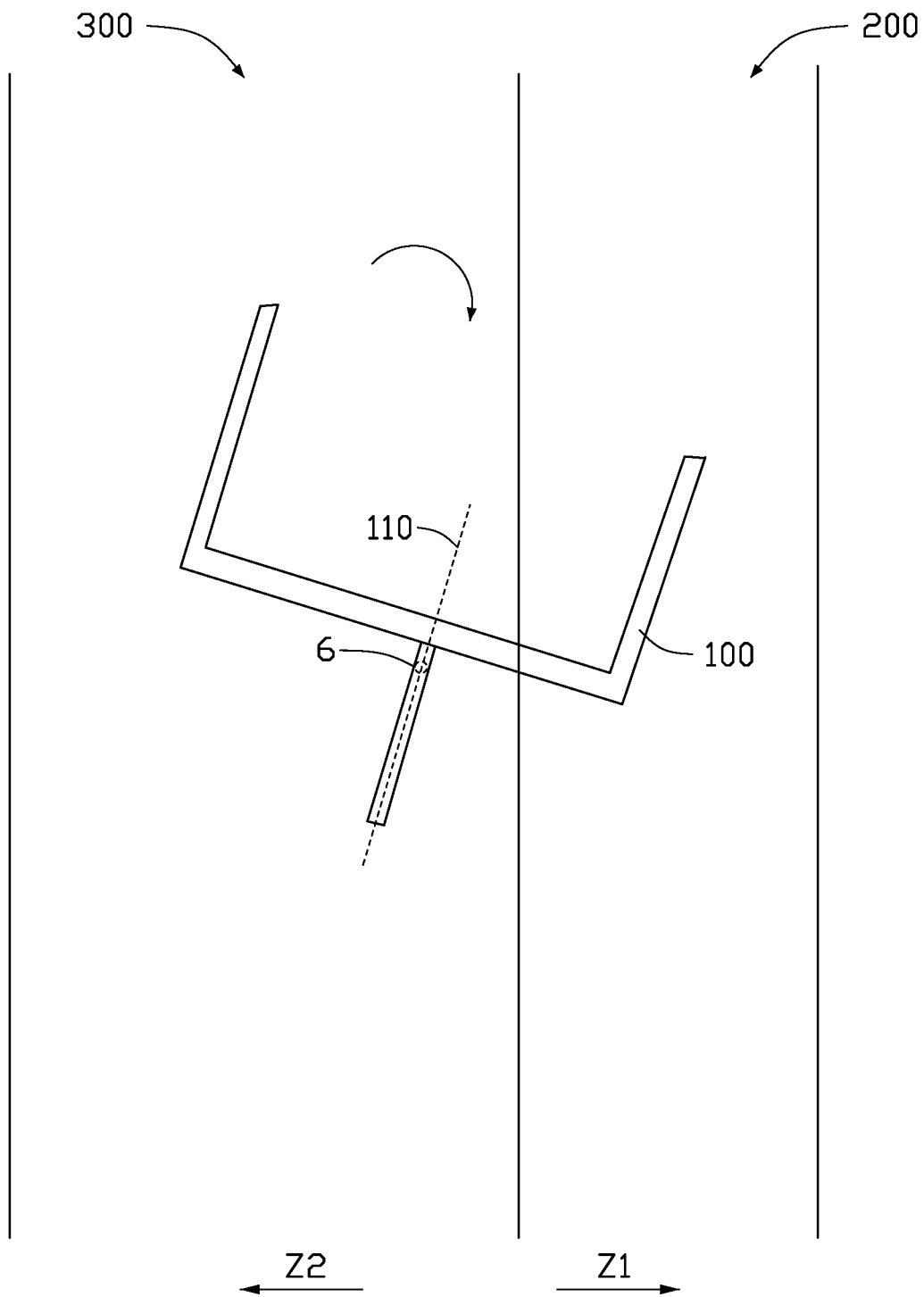

In one embodiment, as shown in FIG. 4B, if the mobile warning triangle 100 was previously deviating to the left, the rotating module 103 rotates the central axis 110 of the mobile warning triangle 100 to the first direction Z1 by the first predetermined angle, the state of the mobile warning triangle 100 is shown in FIG. 4E. At this time, the sensor 6 cannot detect the color of the lane marking 200 during the rotating to the first direction Z1 by the first predetermined angle. The rotating module 103 can further rotate the central axis 110 of the mobile warning triangle 100 to the second direction Z2 by the second predetermined angle, the state of the mobile warning triangle 100 at that time being shown in FIG. 4F. At that time, the sensor 6 can detect or redetect the color of the lane marking 200.

The calculating module 104 can calculate a second deflection angle β2 based on the first orientation information a1 and the third orientation information a3 of the central axis 110 of the mobile warning triangle 100.

Figure 4F:
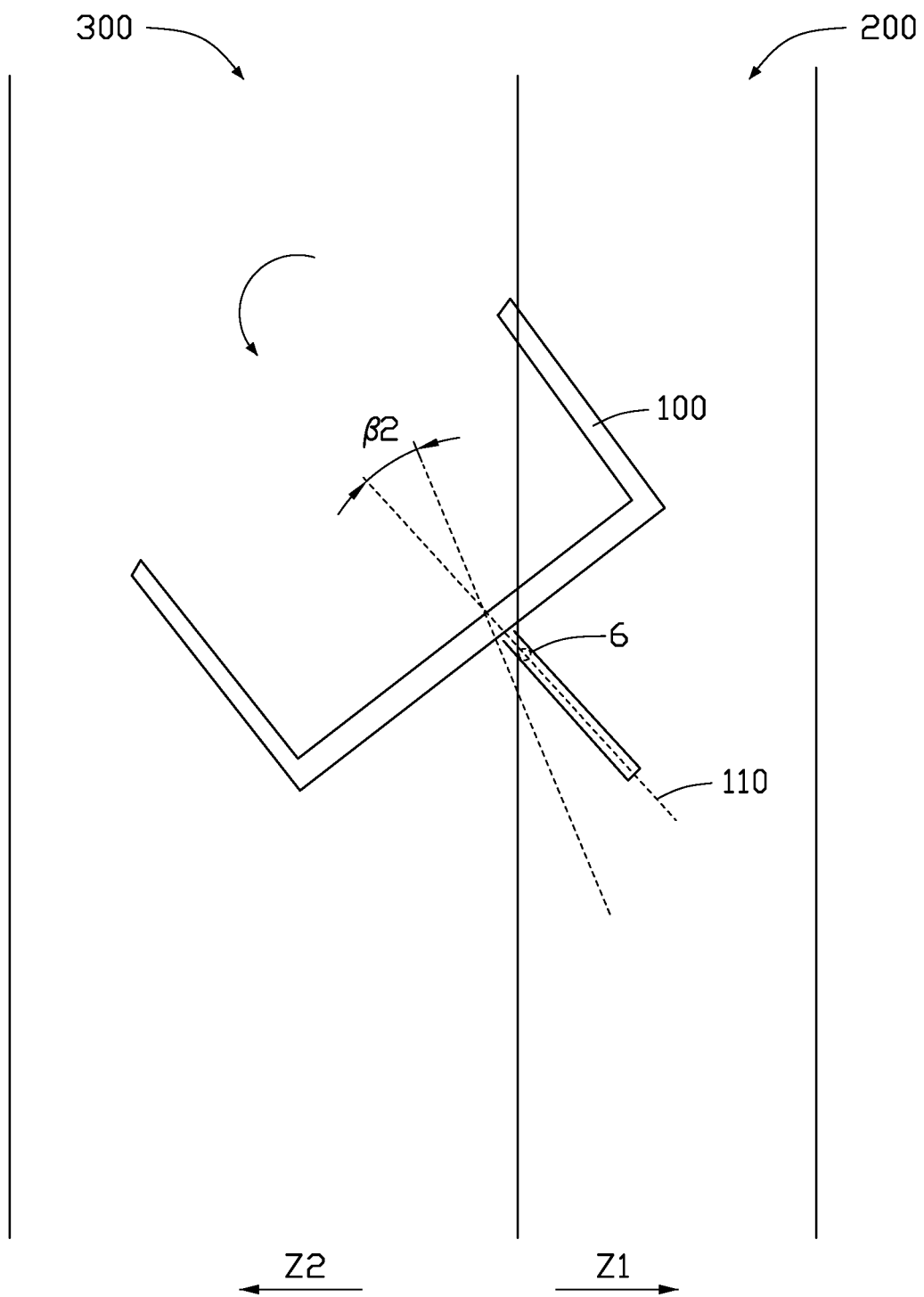

In one embodiment, as shown in FIG. 4F, the acute angle formed between the first orientation information a1 and the third orientation information a3 is the second deflection angle β2.

Figure 4G:
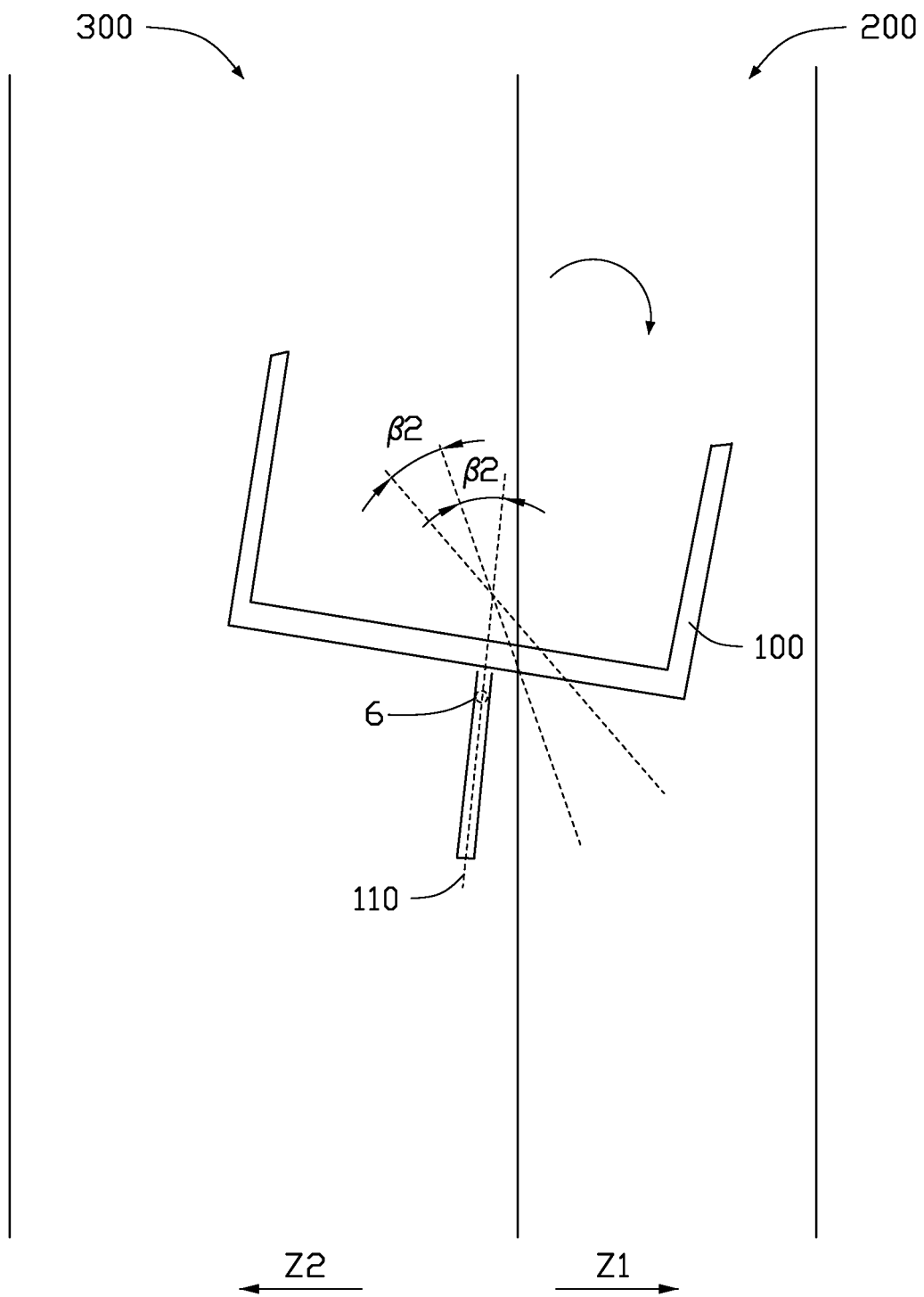

In one embodiment, when the second deflection angle β2 is calculated, the rotating module 103 can rotate the central axis 110 of the mobile warning triangle 100 to the first direction Z1 by two times (twice) the second deflection angle β2 and control the mobile warning triangle 100 to continue moving forward. The warning triangle 100 can be rotated back to the lane marking 200, as shown in FIG. 4G.

When the sensor 6 does not detect the color of the lane marking 200 during the rotating to the second direction Z2 by the second predetermined angle, it may indicate that the mobile warning triangle 100 is deviating far from the lane marking 200, or that the color of the lane marking 200 is unclear. The second control module 105 can control the mobile warning triangle 100 to enter or to assume the coercion mode, to determine whether the sensor 6 can detect the color of the lane marking 200 in the coercion mode.

When the sensor 6 does not detect the color of the lane marking 200 during coercion mode or assumed coercion mode, it may indicate that the mobile warning triangle 100 is deviating far away from the lane marking 200, and a manual intervention is required for the mobile warning triangle 100. Thereupon, the second control module 105 can control the mobile warning triangle 100 to stop moving.

In one embodiment, when the second control module 105 controls the mobile warning triangle 100 to stop moving, a prompt can be outputted to remind a user for manual intervention. For example, the user can manually rotate the position of the mobile warning triangle 100, to cause the sensor 6 can detect the lane marking 200 again.

In one embodiment, the prompt can be outputted by the mobile warning triangle 100, or by an application program (APP) of the mobile warning triangle 100.

For example, if the rotating module 103 rotates the central axis 110 of the mobile warning triangle 100 to the second direction Z2 by the second predetermined angle to try to detect the lane marking 20, the mobile warning triangle 100 will not enter the coercion mode. If the mobile warning triangle 100 does enter the coercion mode, the second control module 105 can control the mobile warning triangle 100 to rotate the central axis 110 of the mobile warning triangle 100 to the first direction Z1 by the second predetermined angle, and move the triangle forward for the first predetermined distance.

In one embodiment, when a moving distance of the mobile warning triangle 100 is equal to the predetermined moving distance, this may be taken as an in-place or placement event. This means that the mobile warning triangle 100 has moved to a suitable distance behind the vehicle, and the second control module 105 can control the mobile warning triangle 100 to stop moving. The predetermined moving distance can be set according to the actual application, for example, the predetermined moving distance is defined as 150 meters. The mobile warning triangle 100 can also support a manual mode or an APP mode to define the predetermined moving distance.

In one embodiment, when the moving distance of the mobile warning triangle 100 is equal to the predetermined moving distance, the mobile warning triangle 100 can be taken as suitably placed, and the second control module 104 can control the mobile warning triangle 100 to move a second distance. Such second distance is a lateral distance, to one side or another. Thereby, the mobile warning triangle 100 can be actually placed or parked in a middle area of the lane 300 to render a warning more effective. For example, the mobile warning triangle 100 can move a second distance toward a left side or toward a right side by receiving a control instruction outputted by the APP, and then stop moving. The second distance can be defined according to the actual requirement, for example, the second distance is 1.5 meters.

Second Embodiment

In one embodiment, the first control module 101 can control the mobile warning triangle 100 to move forward or backward and acquire color information detected by the sensor 6 when the mobile warning triangle 100 is placed on the lane and the sensor 6 detects the lane marking of the lane.

The first control module 101 can control the mobile warning triangle 100 to move forward or backward when the mobile warning triangle 100 is placed on the lane 300 (as shown in FIG. 4A). The sensor 6 can detect the lane marking 200 (as shown in FIG. 4A). The sensor 6 can acquire the color information when the mobile warning triangle 100 is moving forward or backward.

In one embodiment, the lane markings 200 of the road are white and yellow. Along an expressway or a provincial highway, the lane markings 200 are white markings and yellow markings, the road itself is black. There is a significant difference in color between the road and the lane markings 200. The sensor 6 can easily detect and identify the lane markings 200. When a vehicle is considered to be an obstacle on the road, the mobile warning triangle 100 is raised at the first predetermined distance from the stationary vehicle to warn other vehicles. A user can place the mobile warning triangle 100 on the lane 300 in which the vehicle is stationary, and aim the sensor 6 at the lane marking 200 of the lane 300. The sensors 6 can detect the lane marking 200 to control the mobile warning triangle 100 to move forward along the lane marking 200. When the mobile warning triangle 100 is placed on the lane 300 and the sensor 6 detects the lane marking 200 of the lane 300, the first control module 101 controls the mobile warning triangle 100 to move forward. When the mobile warning triangle 100 is moving, the first control module 101 can obtain the color information detected by the sensors 6 in real time to determine a lane departure by the mobile warning triangle 100.

The determining module 102 determines whether the color information detected by the sensor 6 is the color of the lane marking 200.

In one embodiment, when the first control module 101 obtains the color information detected by the sensor 6, the determining module 102 can determine whether the color information detected by the sensor 6 is the one color of the lane marking 200.

In one embodiment, when the determining module 102 determines that the color information detected by the sensor 6 is the color of the lane marking 200, the mobile warning triangle 100 is deemed to be still moving forward along the lane marking 200. There is an absence of deviation of the mobile warning triangle 100 noted, and the first control module 101 controls the mobile warning triangle 100 to continue moving forward.

The rotating module 103 obtains a first orientation information a1 of a central axis 110 of the mobile warning triangle 100 and rotates the central axis 110 of the mobile warning triangle 100 to a second direction by a first predetermined angle when the color information detected by the sensor 6 is not the color of the lane marking 200.

In one embodiment, as shown in FIG. 4A, a first direction Z1 can be a right side of the mobile warning triangle 100, and the second direction Z2 can be a left side of the mobile warning triangle 100. When the determining module 102 determines that the color information detected by the sensor 6 is not the color of the lane marking 200. As shown in FIG. 4a and FIG. 4B, the mobile warning triangle 100 is not moving forward along the lane marking 200 (that is, it is deviating to the left or to the right), the control device 4 may determine that a deviation has occurred in a moving direction of the mobile warning triangle 100. In order to determine whether the mobile warning triangle 100 is deviating to the left of the lane marking 200 or to the right of the lane marking 200, the rotating module 103 can obtain the current orientation information (for example, first orientation information a1) of the central axis 110 of the mobile warning triangle 100 and rotate the moving direction of the mobile warning triangle 100 to the second direction by the first predetermined angle. For example, the rotating module 103 can rotate the central axis 110 of the mobile warning triangle 100 towards the left side of the lane marking 200, by the first predetermined angle.

In one embodiment, the first predetermined angle can be defined according to the actual requirement, for example, the first predetermined angle is 15 degrees.

When the color information detected by the sensor 6 is not the color of the lane marking 200, the rotating module 103 needs to determine whether the mobile warning triangle 100 is in a coercion mode. If the mobile warning triangle 100 is not in the coercion mode, the rotating module 103 obtains the first orientation information a1 of the central axis 110 of the mobile warning triangle 100 and rotates the central axis 110 of the mobile warning triangle 100 to the second direction Z2 by the first predetermined angle. If the mobile warning triangle 100 is in the coercion mode, the rotating module 103 determines whether the sensor 6 detects the color of the lane marking 200 in the coercion mode again.

In one embodiment, when the sensor 6 detects the color of the lane marking 200 during the rotating to the second direction Z2 by the first predetermined angle, the rotating module 103 may determine that the mobile warning triangle 100 has previously deviated to the left of the lane marking 200, and the rotating module 103 can control the mobile warning triangle 100 to stop the direction rotating and obtain the current orientation information (for example, second orientation information a2) of the central axis 110 of the mobile warning triangle 100.

The calculating module 104 can calculate a first deflection angle β1 based on the first orientation information a1 and the second orientation information a2 of the central axis 110 of the mobile warning triangle 100.

In one embodiment, when the first deflection angle β1 is calculated, the rotating module 103 can rotate the central axis 110 of the mobile warning triangle 100 to the first direction Z1 by twice the first deflection angle β1 and control the mobile warning triangle 100 to continue moving forward. The path of the warning triangle 100 can be rotated back to the lane marking 200.

In one embodiment, when the sensor 6 does not detect the color of the lane marking 200 during the rotating to the second direction Z2 by the first predetermined angle, the rotating module 103 further controls the mobile warning triangle 100 to rotate the central axis 110 of the mobile warning triangle 100 to the first direction Z1 by the second predetermined angle.

When the sensor 6 does not detect the color of the lane marking 200 during the rotating to the second direction Z2 by the first predetermined angle, it indicates that the mobile warning triangle 100 may not be deviating to the left of the lane marking 200, and the rotating module 103 can rotate the central axis 110 of the mobile warning triangle 100 to the first direction Z1 by a second predetermined angle. The second predetermined angle can be greater than the first predetermined angle. For example, the second predetermined angle is twice the first predetermined angle. That is, when the mobile warning triangle 100 is deviating, the rotating module 103 can rotate the central axis 110 of the mobile warning triangle 100 to the second direction Z2 by the first predetermined angle, to try to detect or redetect the lane marking 200. If the lane marking 200 is not detected, the mobile warning triangle 100 is recover to the previous state of deviation, and the rotating module 103 further rotates the central axis 110 of the mobile warning triangle 100 to the first direction Z1 by the first predetermined angle, to try to detect or redetect the lane marking 200. That is, when the mobile warning triangle 100 is deviating, the rotating module 103 controls the mobile warning triangle 100 to deflect or swing left and right at the first predetermined angle to try to detect the lane marking 200.

In one embodiment, when the sensor 6 detects the color of the lane marking 200 during the rotating to the first direction Z1 by the second predetermined angle, the rotating module 103 may determine that the mobile warning triangle 100 has previously deviated to the right of the lane marking 200. The rotating module 103 can control the mobile warning triangle 100 to stop the direction rotating and obtain the current orientation information (for example, third orientation information a3) of the central axis 110 of the mobile warning triangle 100.

The calculating module 104 can calculate a second deflection angle β2 based on the first orientation information a1 and the third orientation information a3 of the central axis 110 of the mobile warning triangle 100.

In one embodiment, when the second deflection angle β2 is calculated, the rotating module 103 can rotate the central axis 110 of the mobile warning triangle 100 to the second direction Z2 by twice the second deflection angle β2 and control the mobile warning triangle 100 to continue moving forward. The path of the warning triangle 100 can be rotated back to the lane marking 200.

When the sensor 6 does not detect the color of the lane marking 200 during the rotating to the first direction Z1 by the second predetermined angle, it may indicate that the mobile warning triangle 100 has deviated far from the lane marking 200, or that the color of the lane marking 200 is unclear. The second control module 105 can control the mobile warning triangle 100 to enter the coercion mode, to determine whether the sensor 6 can detect the color of the lane marking 200 in the coercion mode.

When the sensor 6 does not detect the color of the lane marking 200 when in the coercion mode, it may indicate that the mobile warning triangle 100 has deviated far away from the lane marking 200, and a manual intervention is required for the mobile warning triangle 100. The second control module 105 can control the mobile warning triangle 100 to stop moving.

Figure 5:
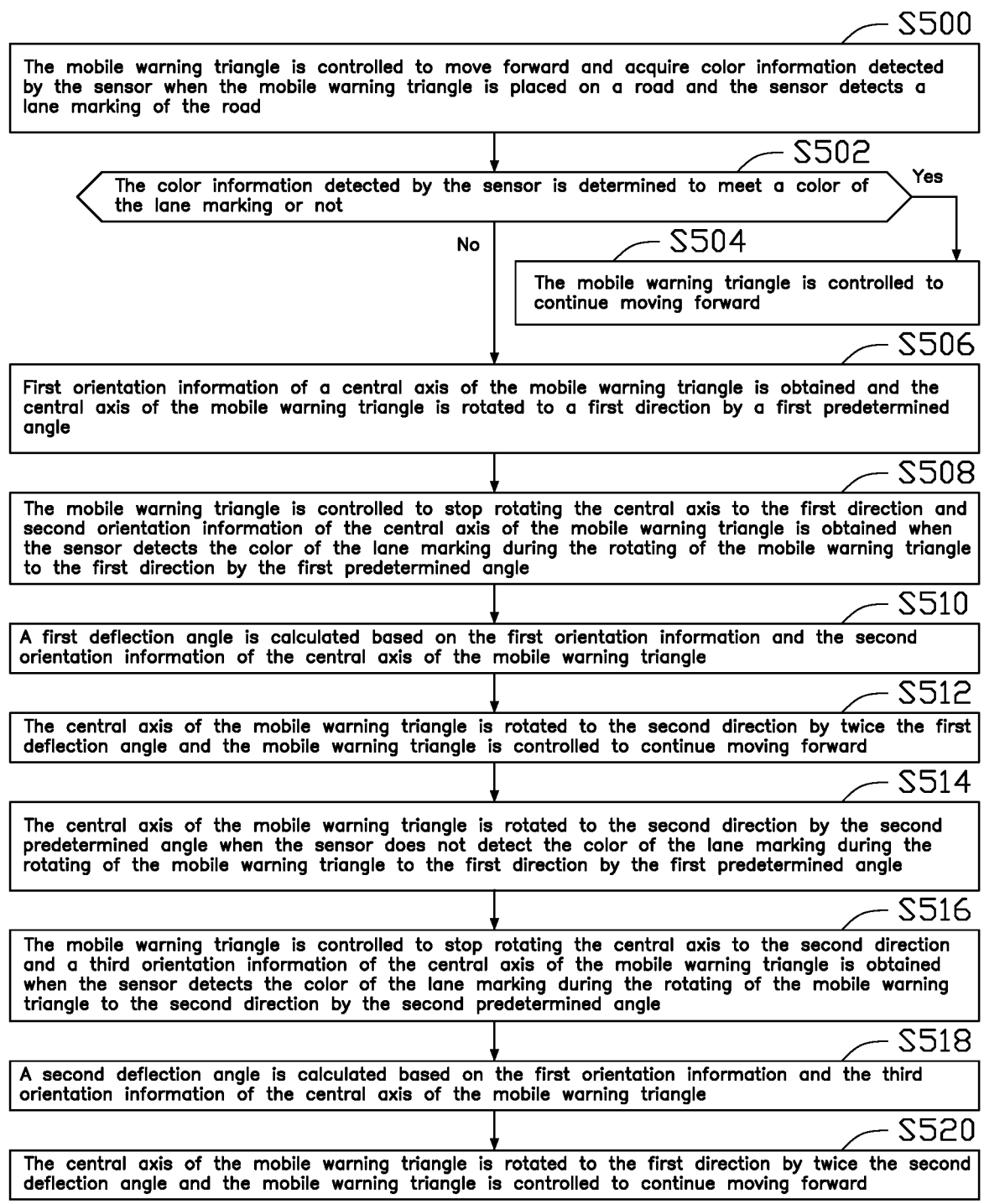
FIG. 5 is a flowchart of a method in an embodiment for controlling the motion of the mobile warning triangle of FIG. 1.

FIG. 5 illustrates one exemplary embodiment of a method for controlling the motion of the mobile warning triangle 100. The flowchart presents an exemplary embodiment of the method. The exemplary method is provided by way of example, as there are a variety of ways to carry out the method. The method described below can be carried out using the configurations illustrated in FIG. 3, for example, and various elements of these figures are referenced in explaining the example method. Each step shown in FIG. 5 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at block 500.

In block 500, the mobile warning triangle 100 is controlled to move forward and acquire color information detected by the sensor 6 when the mobile warning triangle 100 is placed on a road and the sensor 6 detects a lane marking 200 of the road.

In block 502, the color information detected by the sensor 6 is determined to meet a color of the lane marking 200 or not.

In block 504, the mobile warning triangle 100 is controlled to continue moving forward when the color information detected by the sensor 6 is the color of the lane marking 200.

In block 506, first orientation information of a central axis 110 of the mobile warning triangle 100 is obtained and the central axis 110 of the mobile warning triangle 100 is rotated to a first direction by a first predetermined angle when the color information detected by the sensor 6 is other than the color of the lane marking 200.

In block 508, the mobile warning triangle 100 is controlled to stop rotating the central axis 110 to the first direction Z1 and second orientation information of the central axis 110 of the mobile warning triangle 100 is obtained when the sensor 6 detects the color of the lane marking 200 during the rotating of the mobile warning triangle 100 to the first direction Z1 by the first predetermined angle.

In block 510, a first deflection angle is calculated based on the first orientation information and the second orientation information of the central axis 110 of the mobile warning triangle 100.

In block 512, the central axis 110 of the mobile warning triangle 100 is rotated to the second direction Z2 by twice the first deflection angle and the mobile warning triangle is controlled to continue moving forward.

In block 514, the central axis 110 of the mobile warning triangle 100 is rotated to the second direction Z2 by the second predetermined angle when the sensor 6 does not detect the color of the lane marking 200 during the rotating of the mobile warning triangle to the first direction by the first predetermined angle.

In block 516, the mobile warning triangle 100 is controlled to stop rotating the central axis 110 to the second direction Z2 and a third orientation information of the central axis 110 of the mobile warning triangle 100 is obtained when the sensor 6 detects the color of the lane marking 200 during the rotating of the mobile warning triangle 100 to the second direction Z2 by the second predetermined angle.

In block 518, a second deflection angle is calculated based on the first orientation information and the third orientation information of the central axis 110 of the mobile warning triangle 100.

In block 520, the central axis 110 of the mobile warning triangle 100 is rotated to the first direction Z1 by twice the second deflection angle and the mobile warning triangle 100 is controlled to continue moving forward.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method of controlling a mobile warning triangle, the mobile warning triangle comprising a sensor, the method comprising:
    controlling the mobile warning triangle to move forward along a lane marking of a road and acquiring color information detected by the sensor, wherein the mobile warning triangle is placed on the road and the sensor is aimed at the lane marking of the road;
    determining whether the lane marking of the road is detected by the sensor according to the color information detected by the sensor during the mobile warning triangle moving forward;
    controlling the mobile warning triangle to continue moving forward if the color information detected by the sensor corresponds to the lane marking of the road;
    obtaining first deviation information of a central axis of the mobile warning triangle with respect to the lane marking of the road and rotating the central axis of the mobile warning triangle to a first direction by a first predetermined angle if the color information detected by the sensor does not correspond to the lane marking of the road;
    rotating again the central axis of the mobile warning triangle to a second direction by a second predetermined angle if the color information detected by the sensor still does not correspond to the lane marking of the road during the rotating of the mobile warning triangle to the first direction by the first predetermined angle, wherein the first direction is an opposite direction from the second direction;
    controlling the mobile warning triangle to suspend rotating the central axis and obtaining second deviation information of the central axis of the mobile warning triangle with respect to the lane marking of the road once the color information detected by the sensor corresponds to the lane marking of the road during the rotating of the mobile warning triangle to the second direction by the second predetermined angle;
    calculating a first deflection angle based on the first deviation information and the second deviation information of the central axis of the mobile warning triangle; and
    rotating again the central axis of the mobile warning triangle to the first direction by twice the first deflection angle and controlling the mobile warning triangle to continue moving forward until the lane marking of the road is detected by the sensor.

2. The method of claim 1, further comprising:
    controlling the mobile warning triangle to suspend rotating the central axis and obtaining third deviation information of the central axis of the mobile warning triangle with respect to the lane marking of the road once the color information detected by the sensor corresponds to the lane marking of the road during the rotating of the mobile warning triangle to the first direction by the first predetermined angle;
    calculating a second deflection angle based on the first deviation information and the third deviation information of the central axis of the mobile warning triangle; and
    rotating again the central axis of the mobile warning triangle to the second direction by twice the second deflection angle and controlling the mobile warning triangle to continue moving forward until the lane marking of the road is detected by the sensor.

3. The method of claim 2, further comprising:
    determining that the mobile warning triangle is deviated to the lane marking of the road and tilted toward the first direction when the color information detected by the sensor corresponds to the lane marking of the road during the rotating of the mobile warning triangle to the first direction by the first predetermined angle.

4. The method of claim 1, further comprising:
    determining that the mobile warning triangle is deviated to the lane marking of the road and tilted toward the second direction when the color information detected by the sensor corresponds to the lane marking of the road during the rotating of the mobile warning triangle to the second direction by the second predetermined angle.

5. The method of claim 1, wherein the mobile warning triangle further comprises a coercion mode, the method further comprises:
    controlling the mobile warning triangle to enter the coercion mode and redetermining whether the lane marking of the road is detected by the sensor in the coercion mode if the color information detected by the sensor does not correspond to the lane marking of the road during the rotating of the mobile warning triangle to the second direction by the second predetermined angle;
    wherein in the coercion mode, the mobile warning triangle is rotated to an angle opposite to a last rotating angle, and moves forward for a first predetermined distance.

6. The method of claim 5, further comprising:
    controlling the mobile warning triangle to stop moving after the lane marking of the road is still not detected by the sensor in the coercion mode.

7. The method of claim 1, wherein the mobile warning triangle further comprises a coercion mode, the method of obtaining the first deviation information of the central axis of the mobile warning triangle with respect to the lane marking of the road and rotating the central axis of the mobile warning triangle to the first direction by the first predetermined angle comprises:

determining whether the mobile warning triangle is in the coercion mode if the color information detected by the sensor does not correspond to is the lane marking of the road;

obtaining the first deviation information of the central axis of the mobile warning triangle with respect to the lane marking of the road and rotating the central axis of the mobile warning triangle to the first direction by the first predetermined angle if the mobile warning triangle is not in the coercion mode; and determining whether the lane marking of the road is detected by the sensor if the mobile warning triangle is in the coercion mode;

wherein in the coercion mode, the mobile warning triangle is rotated to an angle opposite to a last rotating angle, and moves forward for a first predetermined distance.

8. The method of claim 1, wherein the first direction is the right of the central axis of the mobile warning triangle, and the second direction is the left of the central axis of the mobile warning triangle.

9. The method of claim 1, wherein the first direction is the left of the central axis of the mobile warning triangle, and the second direction is the right of the central axis of the mobile warning triangle.

10. A mobile warning triangle comprising:
a warning triangle;
at least two wheels;
a sensor;
at least one processor; and
a storage device storing one or more programs which when executed by the at least one processor, cause the at least one processor to:
control the mobile warning triangle to move forward along a lane marking of a road and acquire color information detected by the sensor, wherein the mobile warning triangle is placed on the road and the sensor is aimed at the lane marking of the road;
determine whether the lane marking of the road is detected by the sensor according to the color information detected by the sensor during the mobile warning triangle moving forward;
control the mobile warning triangle to continue moving forward if the color information detected by the sensor corresponds to the lane marking of the road;
obtain first deviation information of a central axis of the mobile warning triangle with respect to the lane marking of the road and rotate the central axis of the mobile warning triangle to a first direction by a first predetermined angle if the color information detected by the sensor does not correspond to the lane marking of the road;
rotate again the central axis of the mobile warning triangle to a second direction by a second predetermined angle if the color information detected by the sensor still does not correspond to the lane marking of the road during the rotating of the mobile warning triangle to the first direction by the first predetermined angle, wherein the first direction is an opposite direction from the second direction;
control the mobile warning triangle to suspend rotating the central axis and obtain second deviation information of the central axis of the mobile warning triangle with respect to the lane marking of the road once the color information detected by the sensor corresponds to the lane marking of the road during the rotating of the mobile warning triangle to the second direction by the second predetermined angle;
calculate a first deflection angle based on the first deviation information and the second deviation information of the central axis of the mobile warning triangle; and
rotate again the central axis of the mobile warning triangle to the first direction by twice the first deflection angle and control the mobile warning triangle to continue moving forward until the lane marking of the road is detected by the sensor.

11. The mobile warning triangle of claim 10, wherein the at least one processor is further configured to:
control the mobile warning triangle to suspend rotating the central axis and obtain third deviation information of the central axis of the mobile warning triangle with respect to the lane marking of the road once the color information detected by the sensor corresponds to the lane marking of the road during the rotating of the mobile warning triangle to the first direction by the first predetermined angle;
calculate a second deflection angle based on the first deviation information and the third deviation information of the central axis of the mobile warning triangle; and
rotate again the central axis of the mobile warning triangle to the second direction by twice the second deflection angle and control the mobile warning triangle to continue moving forward until the lane marking of the road is detected by the sensor.

12. The mobile warning triangle of claim 11, wherein the at least one processor is further configured to:
determine that the mobile warning triangle is deviated to the lane marking of the road and tilted toward the first direction if the color information detected by the sensor corresponds to the lane marking of the road during the rotating of the mobile warning triangle to the first direction by the first predetermined angle.

13. The mobile warning triangle of claim 10, wherein the at least one processor is further configured to:
determine that the mobile warning triangle is deviated to the lane marking of the road and tilted toward the second direction if the color information detected by the sensor corresponds to the lane marking of the road during the rotating of the mobile warning triangle to the second direction by the second predetermined angle.

14. The mobile warning triangle of claim 10, wherein the mobile warning triangle further comprises a coercion mode, the at least one processor is further configured to:
control the mobile warning triangle to enter the coercion mode and redetermine whether the lane marking of the road is detected by the sensor in the coercion mode if the color information detected by the sensor does not correspond to the lane marking of the road during the rotating of the mobile warning triangle to the second direction by the second predetermined angle;
wherein in the coercion mode, the mobile warning triangle is rotated to an angle opposite to a last rotating angle, and moves forward for a first predetermined distance.

15. The mobile warning triangle of claim 14, wherein the at least one processor is further configured to:
control the mobile warning triangle to stop moving after the lane marking of the road is still not detected by the sensor in the coercion mode.

16. The mobile warning triangle of claim 10, wherein the mobile warning triangle further comprises a coercion mode, the at least one processor obtaining the first deviation information of the central axis of the mobile warning triangle with respect to the lane marking of the road and rotating the central axis of the mobile warning triangle to the first direction by the first predetermined angle comprises:

determine whether the mobile warning triangle is in the coercion mode when the color information detected by the sensor does not correspond to the lane marking of the road;

obtain the first deviation information of the central axis of the mobile warning triangle with respect to the lane marking of the road and rotate the central axis of the mobile warning triangle to the first direction by the first predetermined angle if the mobile warning triangle is not in the coercion mode;

determine whether the lane marking of the road is detected by the sensor if the mobile warning triangle is in the coercion mode;

wherein in the coercion mode, the mobile warning triangle is rotated to an angle opposite to a last rotating angle, and moves forward for a first predetermined distance.

17. The mobile warning triangle of claim 10, wherein the first direction is the right of the central axis of the mobile warning triangle, and the second direction is the left of the central axis of the mobile warning triangle.

18. The mobile warning triangle of claim 10, wherein the first direction is the left of the central axis of the mobile warning triangle, and the second direction is the right of the central axis of the mobile warning triangle.

\* \* \* \* \*